(12) United States Patent
Liu et al.

(10) Patent No.: US 9,560,088 B2
(45) Date of Patent: *Jan. 31, 2017

(54) METHOD AND APPARATUS FOR INTER-USER EQUIPMENT TRANSFER OF STREAMING MEDIA

(71) Applicant: InterDigital Patent Holdings, Inc., Wilmington, DE (US)

(72) Inventors: Hang Liu, North Potomac, MD (US); Kamel M. Shaheen, King of Prussia, PA (US); Milan Patel, Middlesex (GB); Xavier De Foy, Kirkland (CA); Osama Lotfallah, San Diego, CA (US); Debashish Purkayastha, Collegeville, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 7 days.

This patent is subject to a terminal disclaimer.

(21) Appl. No.: 14/860,325

(22) Filed: Sep. 21, 2015

(65) Prior Publication Data

US 2016/0014171 A1    Jan. 14, 2016

Related U.S. Application Data

(63) Continuation of application No. 13/289,972, filed on Nov. 17, 2011, now Pat. No. 9,143,539.

(Continued)

(51) Int. Cl.
*G06F 15/16* (2006.01)
*H04L 29/06* (2006.01)

(52) U.S. Cl.
CPC ....... *H04L 65/4007* (2013.01); *H04L 65/1083* (2013.01); *H04L 65/1093* (2013.01); *H04L 65/4015* (2013.01)

(58) Field of Classification Search
CPC ............. H04L 65/1083; H04L 65/1006; H04L 65/1016; H04L 65/1063

(Continued)

(56) References Cited

U.S. PATENT DOCUMENTS 7,446,795 B2 * 11/2008 Rengaraju .............. H04N 7/142
                                                       348/14.01
7,693,534 B1 *  4/2010 Lundy ................. H04L 12/1818
                                                       455/459

(Continued)

FOREIGN PATENT DOCUMENTS

EP    2053822       4/2009
EP    2053822 A1 *  4/2009  ............. H04L 29/06

OTHER PUBLICATIONS

Montagud, et al. (Mar. 2010). A new network simulator 2 (NS-2) module based on RTP/RTCP protocols to achieve multimedia group synchronization. In Proceedings of the 3rd International ICST Conference on Simulation Tools and Techniques (p. 31). ICST (Institute for Computer Sciences, Social-Informatics and Telecommunications Engineering).*

(Continued)

*Primary Examiner* — Kristie Shingles
*Assistant Examiner* — Timothy Sowa
(74) *Attorney, Agent, or Firm* — Volpe and Koenig, P.C.

(57) ABSTRACT

Techniques for inter-user equipment (UE) transfer (IUT) are disclosed. An application server may receive an IUT request for transfer of a media session toward at least one initial UE such that the media session is to be played by at least two target UEs. The server may determine eligibility for IUT with group synchronization based on the request. The server may send a message to the initial UE that IUT with group synchronization is not allowed on a condition that IUT with group synchronization is not allowed. Further, the server may trigger inter-destination media synchronization (IDMS)

(Continued)

for group synchronization of media sessions among the UEs on a condition that IUT with group synchronization is allowed. The media sessions may include a first media session and second media session. The media stream may be played by at least two UEs that are geographically separated after the transfer.

20 Claims, 12 Drawing Sheets

Related U.S. Application Data

(60) Provisional application No. 61/415,190, filed on Nov. 18, 2010, provisional application No. 61/415,216, filed on Nov. 18, 2010.

(58) Field of Classification Search
USPC .......................................................... 709/217
See application file for complete search history.

(56) References Cited

U.S. PATENT DOCUMENTS

| | | | | |
|---|---|---|---|---|
| 8,307,049 | B2* | 11/2012 | Peng | H04N 21/643 709/219 |
| 8,385,903 | B2* | 2/2013 | Ghai | H04L 65/1083 455/414.2 |
| 2007/0047590 | A1* | 3/2007 | Curcio | H04L 29/06027 370/503 |
| 2010/0023624 | A1* | 1/2010 | Long | H04L 65/1016 709/227 |
| 2010/0146142 | A1* | 6/2010 | Long | H04L 65/1093 709/231 |
| 2010/0279670 | A1* | 11/2010 | Ghai | H04L 65/1083 455/414.3 |
| 2010/0303100 | A1* | 12/2010 | Niamut | H04L 65/80 370/503 |
| 2010/0312841 | A1* | 12/2010 | Doken | H04L 65/1093 709/206 |
| 2011/0231560 | A1* | 9/2011 | Mahendran | H04L 65/1086 709/228 |
| 2011/0249681 | A1* | 10/2011 | Ayyar | H04L 65/1016 370/401 |
| 2011/0320569 | A1* | 12/2011 | Kim | H04L 65/1093 709/217 |
| 2012/0036277 | A1* | 2/2012 | Stokking | H04N 7/24 709/231 |
| 2012/0084356 | A1* | 4/2012 | Ferdi | H04L 65/1093 709/204 |
| 2012/0137008 | A1* | 5/2012 | Atarius | H04L 65/1006 709/227 |
| 2012/0144056 | A1* | 6/2012 | Stokking | H04L 65/80 709/231 |

OTHER PUBLICATIONS

Patnaik, et al. (Dec. 2009). A framework for converged video services in the IP multimedia subsystem. In Internet Multimedia Services Architecture and Applications (IMSAA), 2009 IEEE International Conference on (pp. 1-6). IEEE.*
Stokking, et al. (Oct. 2010). IPTV inter-destination synchronization: a network-based approach. In Intelligence in Next Generation Networks (ICIN), 2010 14th International Conference on (pp. 1-6). IEEE.*
Interdigital Communications, "Discussion on synchronization issues for Inter-UE Transfers," 3GPP TSG CT WG1 Meeting #68, C1-104775 (Nov. 15-19, 2010).*
Third Generation Partnership Project, "Technical Specification Group Services and System Aspects; Ip Multimedia Subsystem (IMS) Service Continuity; Stage 2 (Release 8)," 3GPP TS 23.237 v8.7.0, Mar. 2010.*
Third Generation Partnership Project, "Technical Specification Group Services and System Aspects; IP Multimedia Subsystem (IMS) Service Continuity; Stage 2 (Release 9)," 3GPP TS 23.237 v9.6.0, Sep. 2010.*
Third Generation Partnership Project, "Technical Specification Group Services and System Aspects; IP Multimedia Subsystem (IMS) Service Continuity; Stage 2 (Release 9)," 3GPP TS 23.237 v9.8.0, Mar. 2011.*
Third Generation Partnership Project, "Technical Specification Group Services and System Aspects; IP Multimedia Subsystem (IMS) Service Continuity; Stage 2 (Release 10)," 3GPP TS 23.237 v10.3.0, Sep. 2010.*
Third Generation Partnership Project, "Technical Specification Group Services and System Aspects; IP Multimedia Subsystem (IMS) Service Continuity; Stage 2 (Release 10)," 3GPP TS 23.237 v10.7.0, Sep. 2011.*
Third Generation Partnership Project, "Technical Specification Group Services and System Aspects; IP Multimedia Subsystem (IMS) Service Continuity; Stage 2 (Release 11)," 3GPP TS 23.237 v11.2.0, Sep. 2011.*
Third Generation Partnership Project, "Technical Specification Group Core Network and Terminals; IP Multimedia (IM) Core Network (CN) Subsystem IP Multimedia Subsystem (IMS) Service Continuity; Stage 3 (Release 8)," 3GPP TS 24.237 v8.6.0, Sep. 2010.*
Third Generation Partnership Project, "Technical Specification Group Core Network and Terminals; IP Multimedia (IM) Core Network (CN) Subsystem IP Multimedia Subsystem (IMS) Service Continuity; Stage 3 (Release 8)," 3GPP TS 24.237 v8.10.0, Sep. 2011.*
Third Generation Partnership Project, "Technical Specification Group Core Network and Terminals; IP Multimedia (IM) Core Network (CN) Subsystem IP Multimedia Subsystem (IMS) Service Continuity; Stage 3 (Release 9)," 3GPP TS 24.237 v9.4.0, Sep. 2010.*
Third Generation Partnership Project, "Technical Specification Group Core Network and Terminals; IP Multimedia (IM) Core Network (CN) Subsystem IP Multimedia Subsystem (IMS) Service Continuity; Stage 3 (Release 9)," 3GPP TS 24.237 v9.8.0, Sep. 2011.*
Third Generation Partnership Project, "Technical Specification Group Core Network and Terminals; IP Multimedia (IM) Core Network (CN) Subsystem IP Multimedia Subsystem (IMS) Service Continuity; Stage 3 (Release 10)," 3GPP TS 24.237 v10.0.0, Sep. 2010.*
Third Generation Partnership Project, "Technical Specification Group Core Network and Terminals; IP Multimedia (IM) Core Network (CN) Subsystem IP Multimedia Subsystem (IMS) Service Continuity; Stage 3 (Release 10)," 3GPP TS 4.237 v10.4.0, Sep. 2011.*
Third Generation Partnership Project, "Technical Specification Group Core Network and Terminals; IP Multimedia (IM) Core Network (CN) Subsystem IP Multimedia Subsystem (IMS) Service Continuity; Stage 3 (Release 11)," 3GPP TS 24.237 v11.0.0, Sep. 2011.*
Third Generation Partnership Project, "Technical Specification Group Core Network and Terminals; IP Multimedia (IM) Core Network (CN) subsystem inter-UE transfer enhancements; Stage 3 (Release 10)," 3GPP TR 24.837 V10.0.0 (Mar. 2011).*
Third Generation Partnership Project, "Technical Specification Group Services and System Aspects; IP Multimedia Subsystem (IMS) based Packet Switch Streaming (PSS) and Multimedia Broadcast/Multicast Service (MBMS) User Service; Protocols (Release 8)," 3GPP TS 26.237 V8.5.0 (Sep. 2010).*
Third Generation Partnership Project, "Technical Specification Group Services and System Aspects; IP Multimedia Subsystem (IMS) based Packet Switch Streaming (PSS) and Multimedia Broadcast/Multicast Service (MBMS) User Service; Protocols (Release 8)," 3GPP TS 26.237 V8.6.0 (Sep. 2011).*
Third Generation Partnership Project, "Technical Specification Group Services and System Aspects; IP Multimedia Subsystem (IMS) based Packet Switch Streaming (PSS) and Multimedia

(56) References Cited

OTHER PUBLICATIONS

Broadcast/Multicast Service (MBMS) User Service; Protocols (Release 9)," 3GPP TS 26.237 V9.4.0 (Sep. 2010).*
Third Generation Partnership Project, "Technical Specification Group Services and System Aspects; IP Multimedia Subsystem (IMS) based Packet Switch Streaming (PSS) and Multimedia Broadcast/Multicast Service (MBMS) User Service; Protocols (Release 9)," 3GPP TS 26.237 V9.7.0 (Sep. 2011).*
Third Generation Partnership Project, "Technical Specification Group Services and System Aspects; IP Multimedia Subsystem (IMS) based Packet Switch Streaming (PSS) and Multimedia Broadcast/Multicast Service (MBMS) User Service; Protocols (Release 10)," 3GPP TS 26.237 V10.0.0 (Sep. 2010).*
Third Generation Partnership Project, "Technical Specification Group Services and System Aspects; IP Multimedia Subsystem (IMS) based Packet Switch Streaming (PSS) and Multimedia Broadcast/Multicast Service (MBMS) User Service; Protocols (Release 10)," 3GPP TS 26.237 V10.3.0 (Sep. 2011).*
Third Generation Partnership Project, "Technical Specification Group Core Network and Terminals; IP Multimedia (IM) Core Network (CN) subsystem inter-UE transfer enhancements; Stage 3 (Release 10)," 3GPP TR 24.837 0.4.0 (Oct. 2010).*
Third Generation Partnership Project, "Technical Specification Group Core Network and Terminals; IP Multimedia (IM) Core Network (CN) subsystem IP Multimedia Subsystem (IMS) inter-UE transfer; Stage 3 (Release 10)," 3GPP TS 24.337 V10.2.0 (Sep. 2011).*
Third Generation Partnership Project, "Technical Specification Group Core Network and Terminals; IP Multimedia (IM) Core Network (CN) Subsystem IP Multimedia Subsystem (IMS) Service Continuity; Stage 3 (Release 10)," 3GPP TS 24.237 v10.4.0, Sep. 2011.
Third Generation Partnership Project, "Technical Specification Group Core Network and Terminals; IP Multimedia (IM) Core Network (CN) Subsystem IP Multimedia Subsystem (IMS) Service Continuity; Stage 3 (Release 11)," 3GPP TS 24.237 v11.0.0, Sep. 2010.
Third Generation Partnership Project, "Technical Specification Group Core Network and Terminals; IP Multimedia (IM) Core Network (CN) subsystem inter-UE transfer enhancements; Stage 3 (Release 10)," 3GPP TS 24.837 V10.0.0 (Mar. 2011).
Third Generation Partnership Project, "Technical Specification Group Core Network and Terminals; IP Mutlimedia (IM) Core Network (CN) subsystem IP Multimedia Subsystem (IMS) inter-UE transfer; Stage 3 (Release 10)," 3GPP TS 24.337 V10.2.0 (Sep. 2011).
Montagud, et al., "A new network simulator 2 (NS-2) module based on RTP/RTCP protocols to achieve multimedia group synchronization." In Proceedings of the 3rd International I CST Conference on Simulation Tools and Techniques (p. 31). ICST (Institute for Computer Sciences, Social-Informatics and Telecommunications Engineering) (Mar. 2010).
Patnaik, et al., "A framework for converged video services in the IP multimedia subsystem." In Internet Multimedia Services Architecture and Applications (IMSAA), 2009 IEEE International Conference on (pp. 1-6). IEEE. (Dec. 2009).
Stokking, et al., "IPTV inter-destination synchronization: a network-based approach." In Intelligence in Next Generation Networks (ICIN), 2010 14th International Conference on (pp. 1-6). IEEE. (Oct. 2010).

\* cited by examiner

METHOD AND APPARATUS FOR INTER-USER EQUIPMENT TRANSFER OF STREAMING MEDIA

CROSS REFERENCE TO RELATED APPLICATIONS

This application is a continuation of U.S. patent application Ser. No. 13/298,972 filed Nov. 17, 2011, which issued as U.S. Pat. No. 9,143,539 on Sep. 22, 2015, which claims the benefit of U.S. provisional application Nos. 61/415,190 filed Nov. 18, 2010 and 61/415,216 filed Nov. 18, 2010, the contents of which are hereby incorporated by reference herein.

BACKGROUND

Inter-user equipment (UE) transfer (IUT) transfers at the IP multimedia subsystem (IMS) level of all or some of the media flows and associated signaling between UEs. IUT for service continuity allows a multimedia session to be split on the local end across two or more UEs that are part of the collaborative session. FIG. 1 shows an example IUT operation. In FIG. 1, UE1 is running a multimedia session that comprises audio and video from a remote server. After IUT, the audio session is transferred to UE2 and the video session is transferred to UE3.

FIG. 2 is an example signaling flow for IUT operation. UE1 sends an IUT request to the service centralization and continuity (SCC) application server (AS) for transfer of the video session toward UE2 (12). The SCC AS sends a request to UE2 to establish an access leg on UE2, and updates the remote leg (14). The access leg is the call control leg between the UE and the SCC AS. The remote leg is the call control leg between the SCC AS and the remote party. The SCC AS sends an IUT response to UE1 (16), and the video session is transferred to UE2 (18). UE1 sends an IUT request to the SCC AS for transfer of the audio session toward UE3 (20). The SCC AS sends a request to establish an access leg on UE3, and updates the remote leg (22). The SCC AS sends an IUT response to UE1 (24), and the audio session is transferred to UE3 (26).

When media is split and transferred to two different devices, there may be a considerable lag between the first transferred media and the second transferred media (i.e., audio and video in FIGS. 1 and 2).

SUMMARY

Techniques for inter-user equipment (UE) transfer (IUT) are disclosed. An application server may receive an IUT request for transfer of a media session toward at least one initial UE such that the media session is to be played by at least two target UEs. The server may determine eligibility for IUT with group synchronization based on the request. The server may send a message to the initial UE that IUT with group synchronization is not allowed on a condition that IUT with group synchronization is not allowed. Further, the server may trigger inter-destination media synchronization (IDMS) for group synchronization of media sessions among the UEs on a condition that IUT with group synchronization is allowed. The media sessions may include a first media session and second media session. The first media session may be for audio and the second media session may be for video. The media stream may be played by at least two UEs that are geographically separated after the transfer.

Techniques for IUT are disclosed. An application server may receive an IUT request for transfer of a media session toward at least one UE such that a media stream is played by at least two UEs that are geographically separated after the transfer. The application server may trigger inter-destination media synchronization (IDMS) for group synchronization of the media session among the UEs. The media stream may be anchored at a media server, and a media synchronization application server for the IDMS may be running at the media server. Alternatively, the media stream may be anchored at a media resource function (MRF), and a media synchronization application server for the IDMS may be running at the MRF.

BRIEF DESCRIPTION OF THE DRAWINGS

A more detailed understanding may be had from the following description, given by way of example in conjunction with the accompanying drawings wherein.

DETAILED DESCRIPTION

Figure 1:
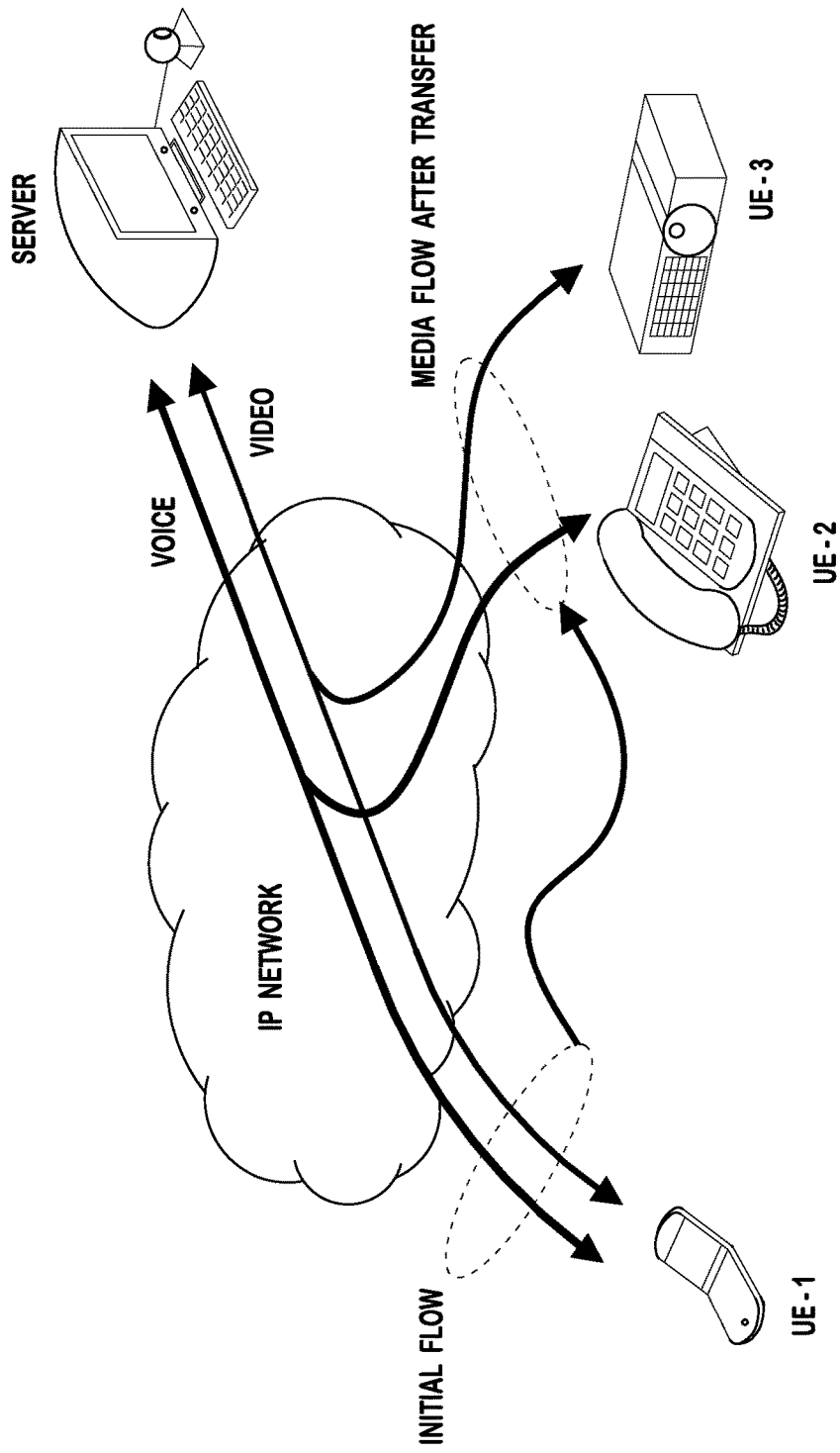
FIG. 1 shows an example IUT operation.
Figure 2:
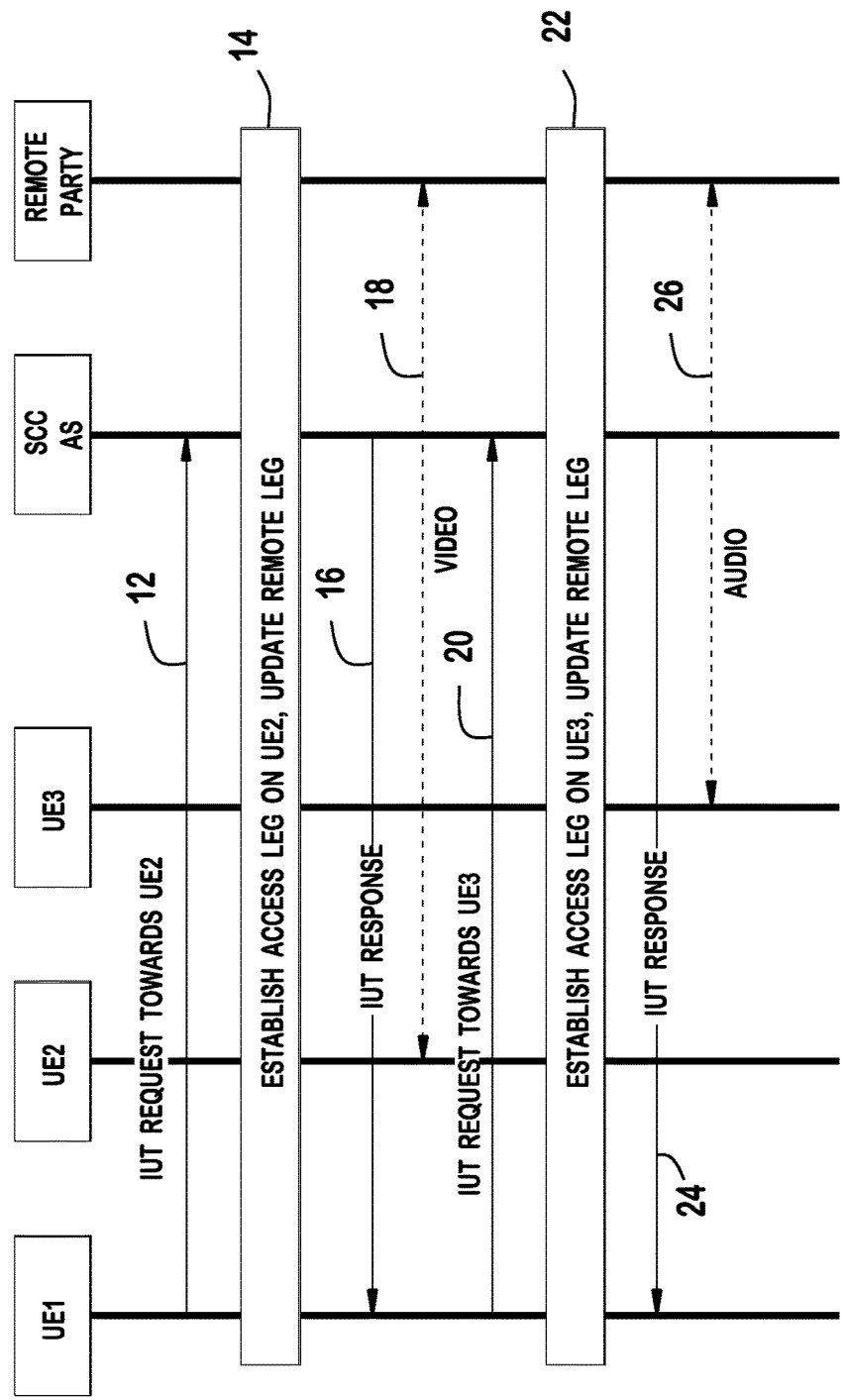
FIG. 2 shows an example signaling flow for IUT operation.
Figure 3A:
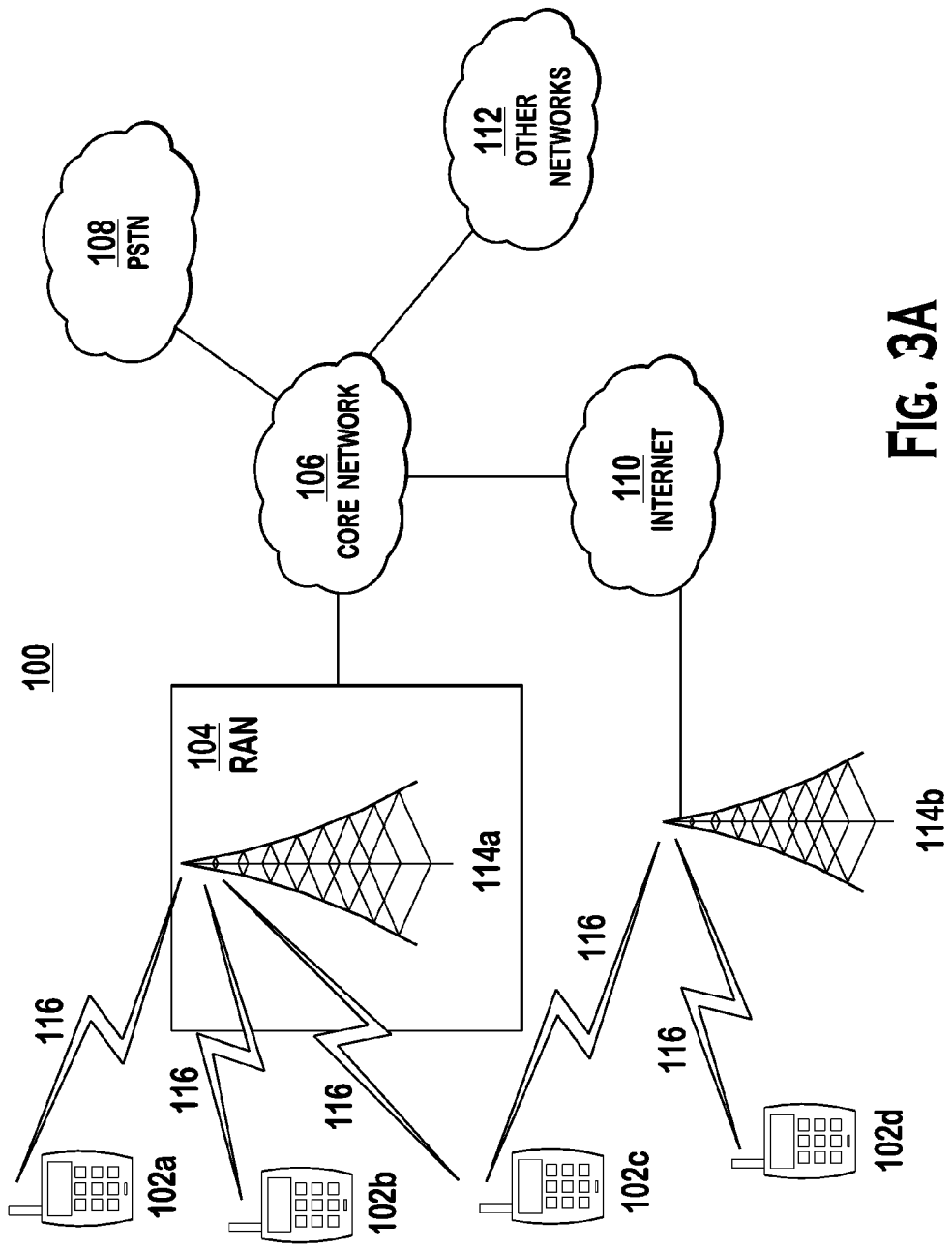
FIG. 3A is a system diagram of an example communications system in which one or more disclosed embodiments may be implemented.

FIG. 3A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 3A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 3A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 3A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 3A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 3A may be configured to communicate with the base station 114a, which may employ a cellular-based radio technology, and with the base station 114b, which may employ an IEEE 802 radio technology.

Figure 3B:
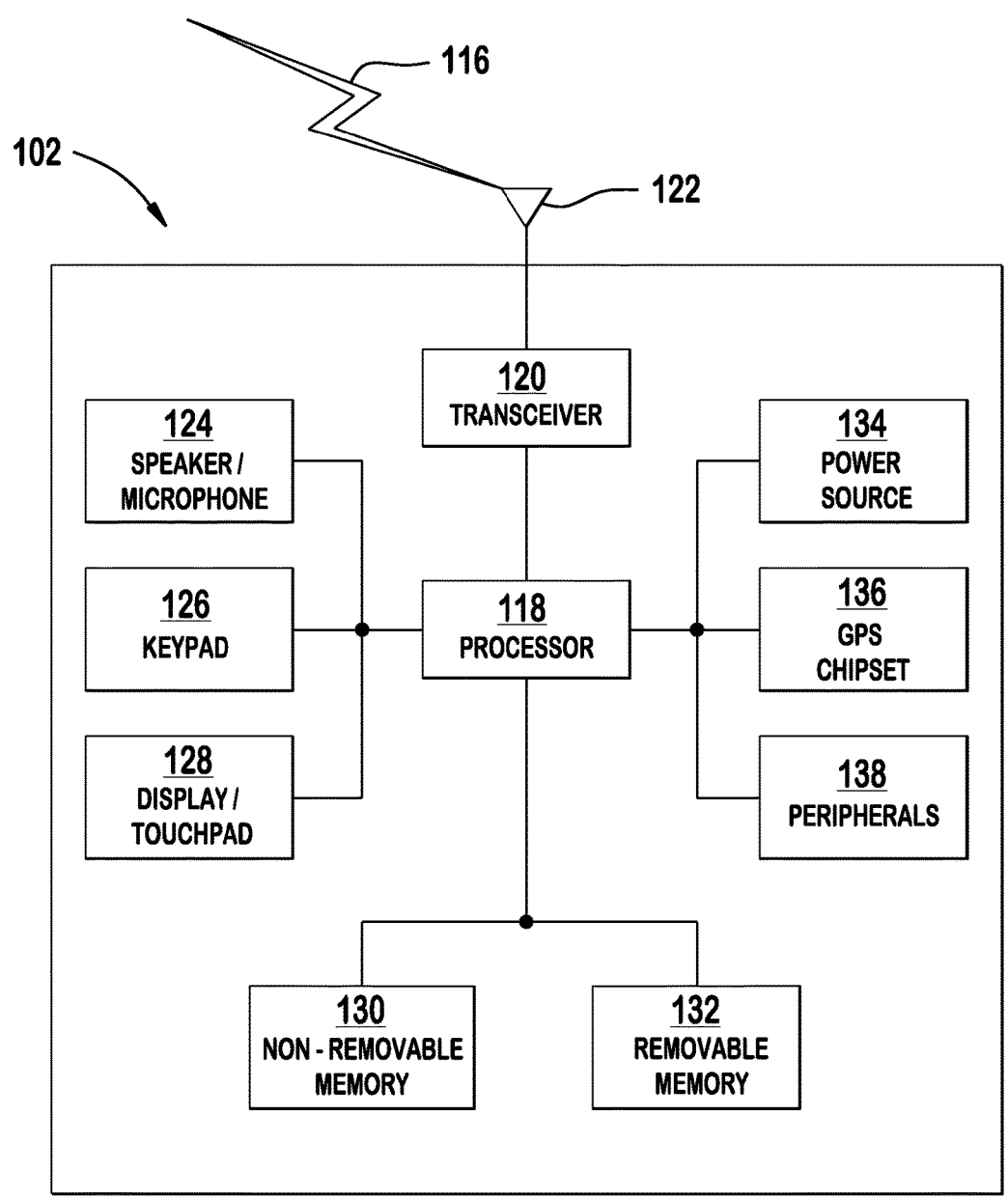
FIG. 3B is a system diagram of an example wireless transmit/receive unit (WTRU) that may be used within the communications system illustrated in FIG. 3A.

FIG. 3B is a system diagram of an example WTRU 102. As shown in FIG. 3B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 3B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 3B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 3C:
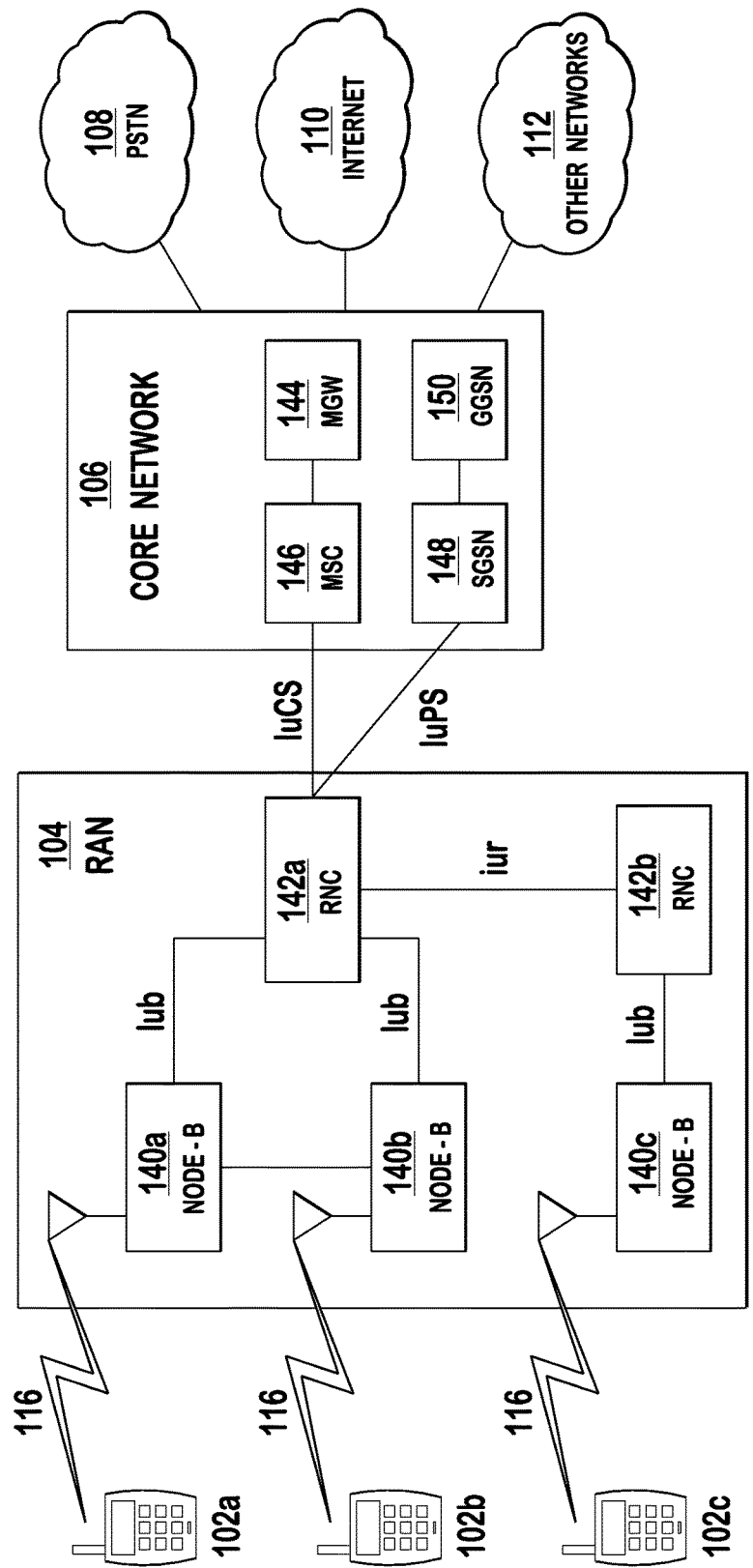
FIG. 3C is a system diagram of an example radio access network and an example core network that may be used within the communications system illustrated in FIG. 3A.

FIG. 3C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 3C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 3C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 3C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

In accordance with one embodiment, the IUT request to the SCC AS may trigger an inter destination media synchronization (IDMS) session, (e.g., real-time transport protocol (RTP)/real-time transport control protocol (RTCP)-based IDMS), for the transferred media streams.

IDMS refers to the play-out of media streams at two or more geographically distributed locations in a temporally synchronized manner. It may be applied to any type of streaming media, such as audio, video, text, and the like. RTP and RTCP are typically used in conjunction with the IDMS. Hereafter, the embodiments will be explained with reference to RTP/RTCP-based IDMS, but it may be extended to IDMS based on different protocols.

RTP provides end-to-end network transport functions for applications requiring real-time data transport, such as audio, video, or data. RTCP is used for monitoring the data delivery in the RTP data transport. RTP receivers and senders provide reception quality feedback by sending out RTCP receiver report (RR) and sender report (SR) packets, which may be augmented by an extended report (XR).

Figure 4:
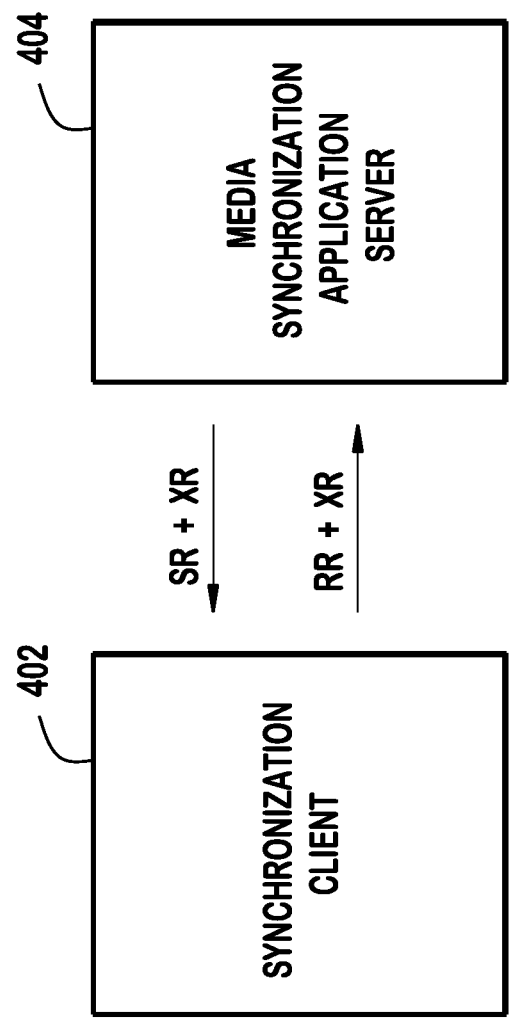
FIG. 4 shows an example system for IDMS.

FIG. 4 shows an example system for IDMS. IDMS involves collection, summarizing, and distribution of RTP packet arrival and play-out times among a plurality of synchronization clients (SCs) 402 in a synchronization group. SDP signaling may be used to set up and maintain the synchronization group. An SC 402 reports RTP packet arrival times and play-out times of a media stream to a media synchronization application server (MSAS) 404. The RTCP XR may be used to report information on receipt times and presentation times of RTP packets. The time information exchanged as part of the RTCP XR includes packet received network time protocol (NTP) timestamp, packet received RTP timestamp, packet presented NTP timestamp, or the like.

The MSAS 404 collects RTP packet arrival times and play-out times from one or more SC(s) 402 in a synchronization group. The MSAS 404 summarizes and distributes this information to the SCs 402 in the synchronization group, for example, by determining the SC 402 with the most lagged play-out and using its reported RTP packet arrival time and play-out time as a summary. The SC 402 receives the summaries of such information, and uses that to adjust timing for its play-out buffer.

Figure 5:
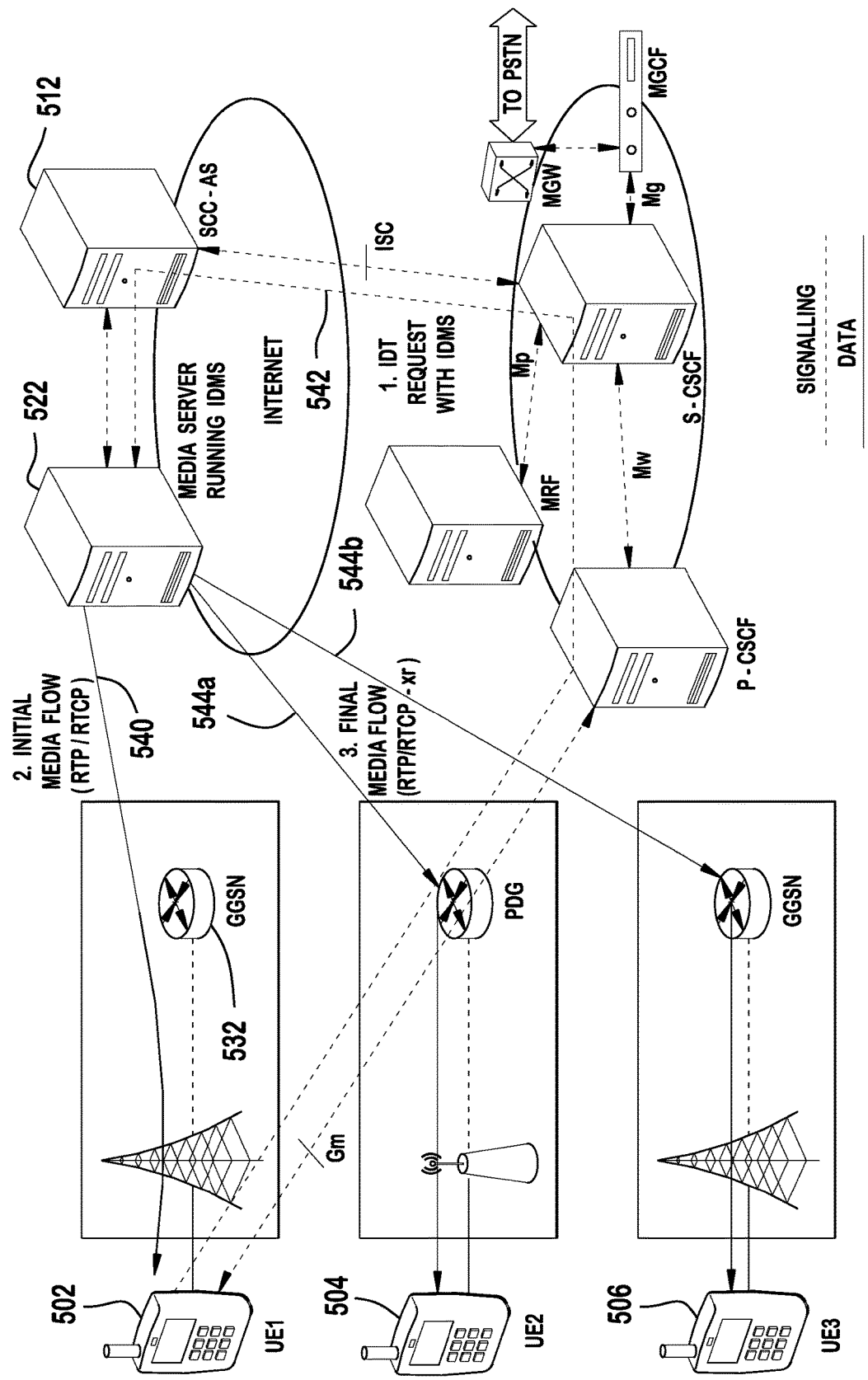
FIG. 5 shows an example session transfer in accordance with one embodiment.

FIG. 5 shows an example session transfer in accordance with one embodiment. UE1 502 currently has a multimedia session and wants to transfer the session to UE2 504 and UE3 506. The media stream may be split on the local end across two or more UEs, in which a collaborative session across two or more UEs (that may or may not include UE1) is established due to the IUT. Alternatively, the whole media session may be transferred from UE1 to the other UE(s). Alternatively, a new media session may be added with a new UE while maintaining the current session with UE1. It should be noted that embodiments disclosed hereinafter are applicable to any cases.

The media is anchored at the remote server 522 (media server), and the initial media flow 540 to UE1 502 is established, for example, via a GGSN 532. The remote server 522 is capable of running IDMS, (e.g., RTP/RTCP-based IDMS). UE1 502 sends an IUT transfer request 542 to the SCC AS 512, informing the SCC AS 512 of the requirement for IDMS. The media flows 544a, 544b are established after the IUT. The SCC AS 512 provides the coordination of the IUT procedures.

The IUT request message from UE1 502 to the SCC AS 512 includes information for the SCC AS 512 to identify the media flow 540 to be transferred and identify the target of the transferred media flow 540, and any other information that is necessary to control the media transfer. For example, the IUT request may contain the current session ID to be transferred and an indication that a group synch is required (e.g., setting an IDMS request flag). The IUT request may also include a sync group ID. The SCC AS 512 updates the remote leg and the target access leg of the session. Based on the input from the SCC AS 512, the remote server 522 starts an IDMS session.

Figure 6:
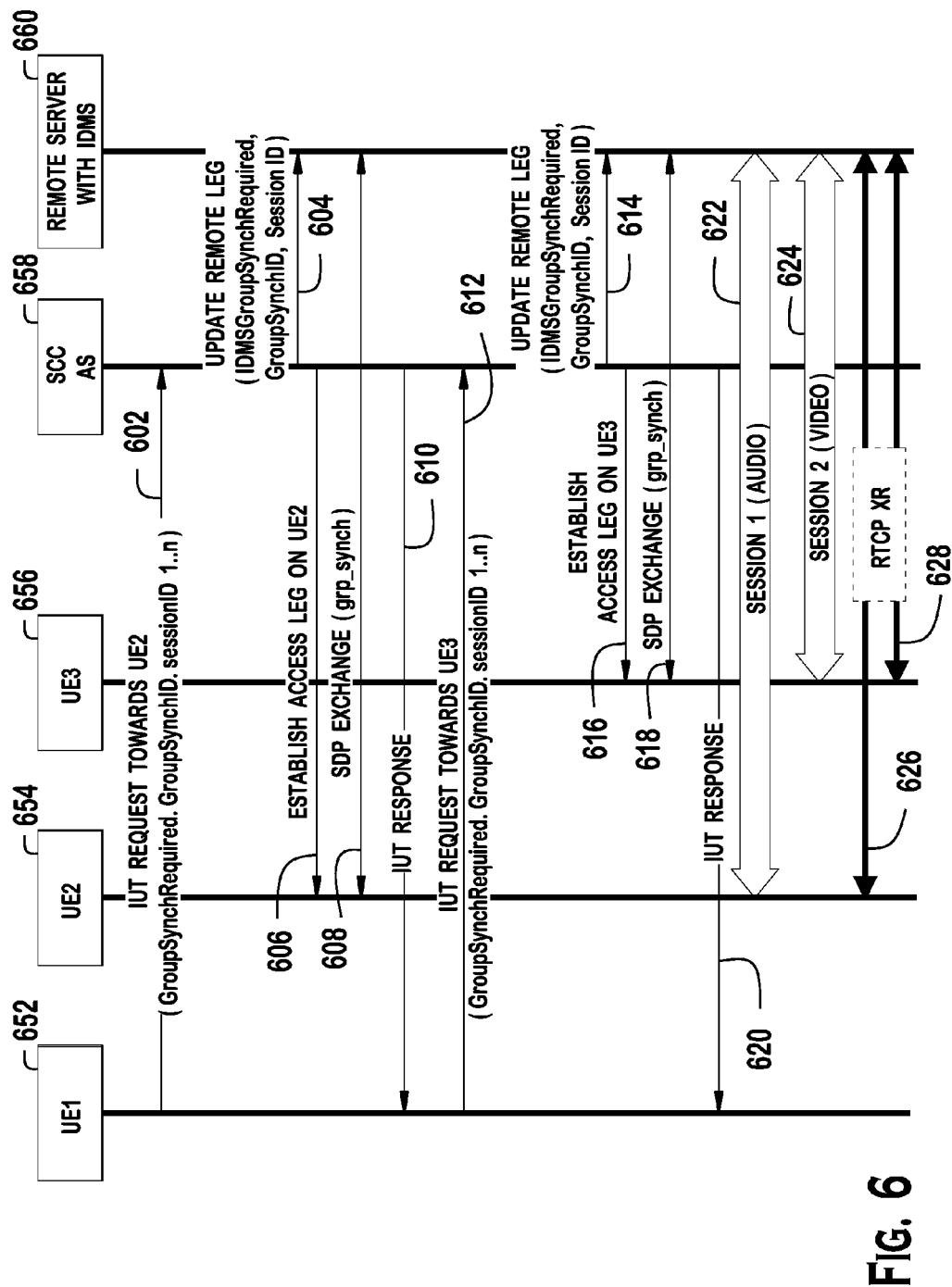
FIG. 6 shows an example signaling flow for the session transfer in accordance with one embodiment.

FIG. 6 shows an example signaling flow for the session transfer in accordance with one embodiment. UE1 652 currently has multimedia sessions (e.g., session 1 for audio and session 2 for video) and wants to transfer session 1 to UE2 654 and session 2 to UE3 656. The media is anchored at the remote server (media server), and the remote server is capable of running IDMS. UE1 652 sends an IUT request to the SCC AS 658 for transfer of session 1 towards UE2 654 (602). The IUT request message may include an indication that group synchronization is requested, a group synch ID, and a session ID(s) to be transferred. The SCC AS 658 associates the session(s) with the group synch ID. The SCC AS 658 checks eligibility for the IUT and, if it is not allowed, the SCC AS 658 informs UE1 652 that IUT with group synch is not allowed. If IUT with group synch is allowed, the SCC AS 658 updates the remote leg with the group synchronization information (IDMS group synch request, group synch ID, and session ID(s)) (604).

The SCC AS 658 sends a request to UE2 654 to establish an access leg at UE2 654 for the transferred media session (606). SDP messages may be exchanged between the remote server 660 and UE2 654 for group synchronization (608). The SCC AS 658 sends an IUT response to UE1 652 (610).

The above steps may be repeated for additional transfer of media sessions. UE1 652 sends another IUT request to the SCC AS 658 for transfer of session 2 towards UE3 656 (612). The IUT request message may include an indication that group synchronization is required, a group synch ID, and the session ID(s) to be transferred. The SCC AS 658 associates the session(s) with the group synch ID. The SCC AS 658 updates the remote leg with the group synchronization information (IDMS group synch request, group synch ID, and session ID(s)) (614).

The SCC AS 658 sends a request to UE3 656 to establish an access leg at UE3 656 for the transferred media session (616). SDP messages may be exchanged between the remote server and UE3 656 for group synchronization (618). The SCC AS 658 sends an IUT response to UE1 652 (620). The multimedia sessions are then created between the remote server 660 and UE2 654 and UE3 656, respectively, (622, 624). UE2 654 and UE3 656 exchange RTCP extended reports (XR) for IDMS operations with the remote server (626, 628).

Figure 7:
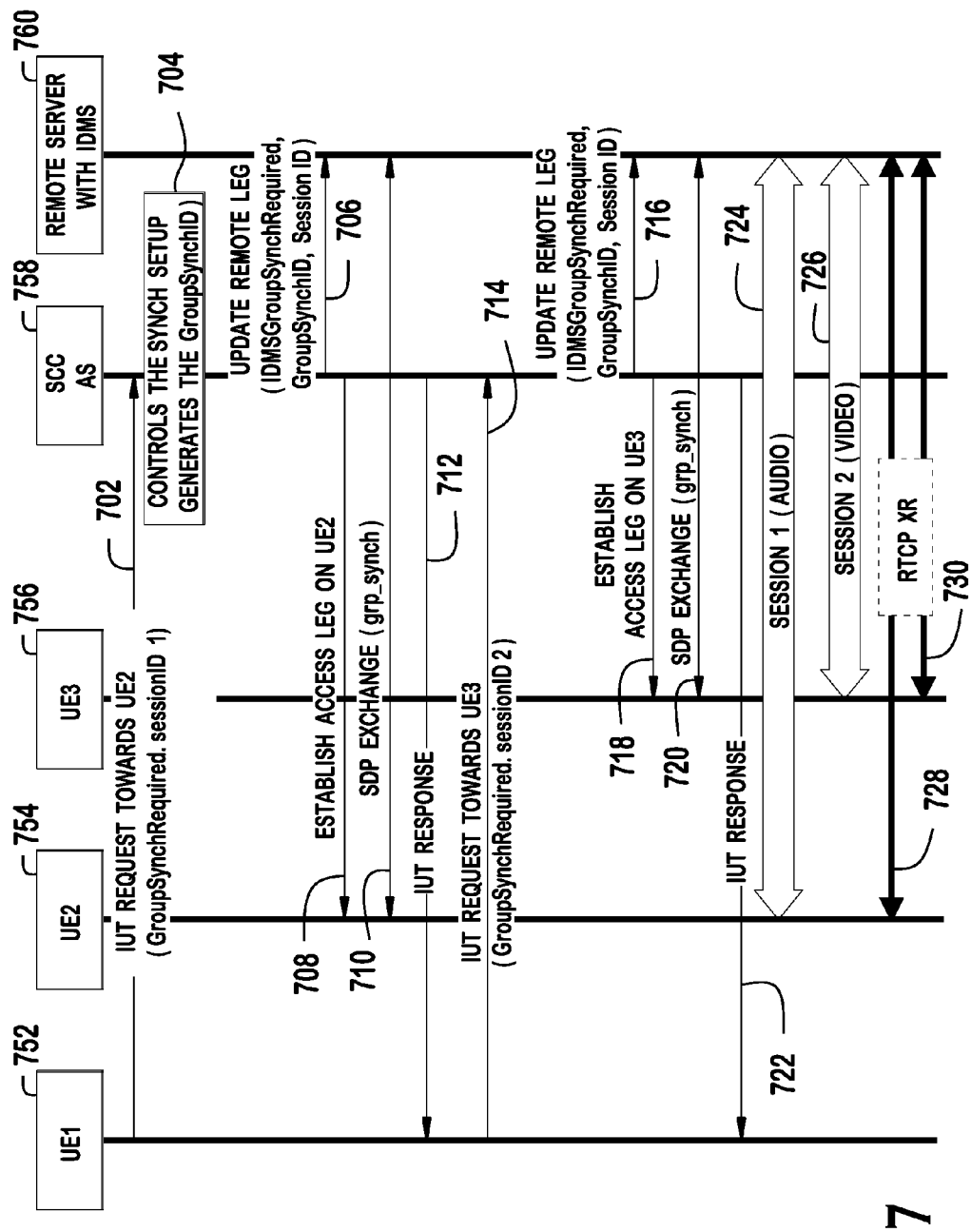
FIG. 7 shows an example signaling flow for the session transfer in accordance with another embodiment wherein the SCC AS takes more control of the IDMS session.

FIG. 7 shows an example signaling flow for the session transfer in accordance with another embodiment wherein the SCC AS takes more control of the IDMS session. UE1 752 currently has multimedia sessions (e.g., session 1 for audio and session 2 for video) and wants to transfer session 1 to UE2 754 and session 2 to UE3 756. The media is anchored at the remote server 760 (media server), and the remote server 760 is capable of running IDMS. UE1 752 sends an IUT request to the SCC AS 758 for transfer of session 1 towards UE2 754 (702). The IUT request message includes an indication that group synchronization is required and the session ID(s) to be transferred. The SCC AS 758 checks eligibility for the IUT and, if it is not allowed, the SCC AS 758 informs UE1 752 that IUT with group synch is not allowed. If it is allowed, the SCC AS 758 performs the procedures for controlling the synch setup including generation of the synch ID (704). If the requested session(s) is part of any existing synch group, the SCC AS 758 retrieves the group synch ID, and updates the database with the session ID(s). If the requested session(s) is not part of the existing synch group, the SCC AS 758 generates a new group synch ID, and associates the session(s) with the group synch ID. In later session transfer requests from the same UE, the SCC AS 758 may decide, by itself or depending on user input, to determine which synch group should it be associated with. The SCC AS 758 updates the remote leg with the group synchronization information (the IDMS group synch request, the group synch ID, and the session ID(s)) (706). The SCC AS 758 sends a request to UE2 754 to establish an access leg at UE2 754 for the transferred media session (708). SDP messages are exchanged between the remote server 760 and UE2 754 for group synchronization (710). The SCC AS 758 sends an IUT response to UE1 752 (712).

UE1 752 sends another IUT request towards UE3 to the SCC AS 758 for transfer of session 2 (714). The IUT request message includes an indication that group synchronization is required, and the session ID to be transferred. The SCC AS 758 updates the remote leg with the group synchronization information (the IDMS group synch request, the group synch ID, and the session ID(s)) (716). The SCC AS 758 sends a request to UE3 756 to establish an access let at UE3 756 for the transferred media session (718). SDP messages are exchanged between the remote server 760 and UE3 756 for group synchronization (720). The SCC AS 758 sends an IUT response to UE1 752 (722). The multimedia sessions are then created between the remote server 760 and UE2 754 and UE3 756, respectively (724, 726). UE2 754 and UE3 756 exchange RTCP extended report (XR) for IDMS operations with the remote server (728, 730).

The SCC AS may keep track of the ongoing group synch sessions and associated media streams (e.g., store in a database). Users may change the group synch, or may leave or join the synch group by requesting it to the SCC AS. The remote server may also change the group synch service. If synch is lost multiple times, the remote server may inform the SCC AS to terminate the group synch as well as IUT process.

The SCC AS may choose a master session and indicate it to the remote server running IDMS. The remote server may accept the master stream and make other stream(s) to follow the master stream. The master stream refers to a single stream/flow among many other streams/flows in a group, which is used as a reference for synchronization purpose. For example, in a video stream there may be two substreams or flows such as video and audio substreams. In most of the cases the video substream may be designated as a master stream and the audio substream may be designated as a slave substream following the main substream. The audio substream may be synchronized by following the video substream. The SCC AS may change the master session at any time and indicate it to the remote server. The remote server may change the master setting and make the slave to follow to the master stream.

In another embodiment, the media may be anchored at the media resource function (MRF) and the IDMS server may be running on the MRF. The MRF provides media related functions such as media manipulation (e.g., voice stream mixing) and playing of tones and announcements. The MRF is further divided into a media resource function controller (MRFC) and a media resource function processor (MRFP). The MRFC is a signalling plane node that interprets information coming from an application server (AS) and a serving call session control function (S-CSCF) to control the MRFP. The MRFP is a media plane node used to mix, source, or process media streams.

Figure 8:
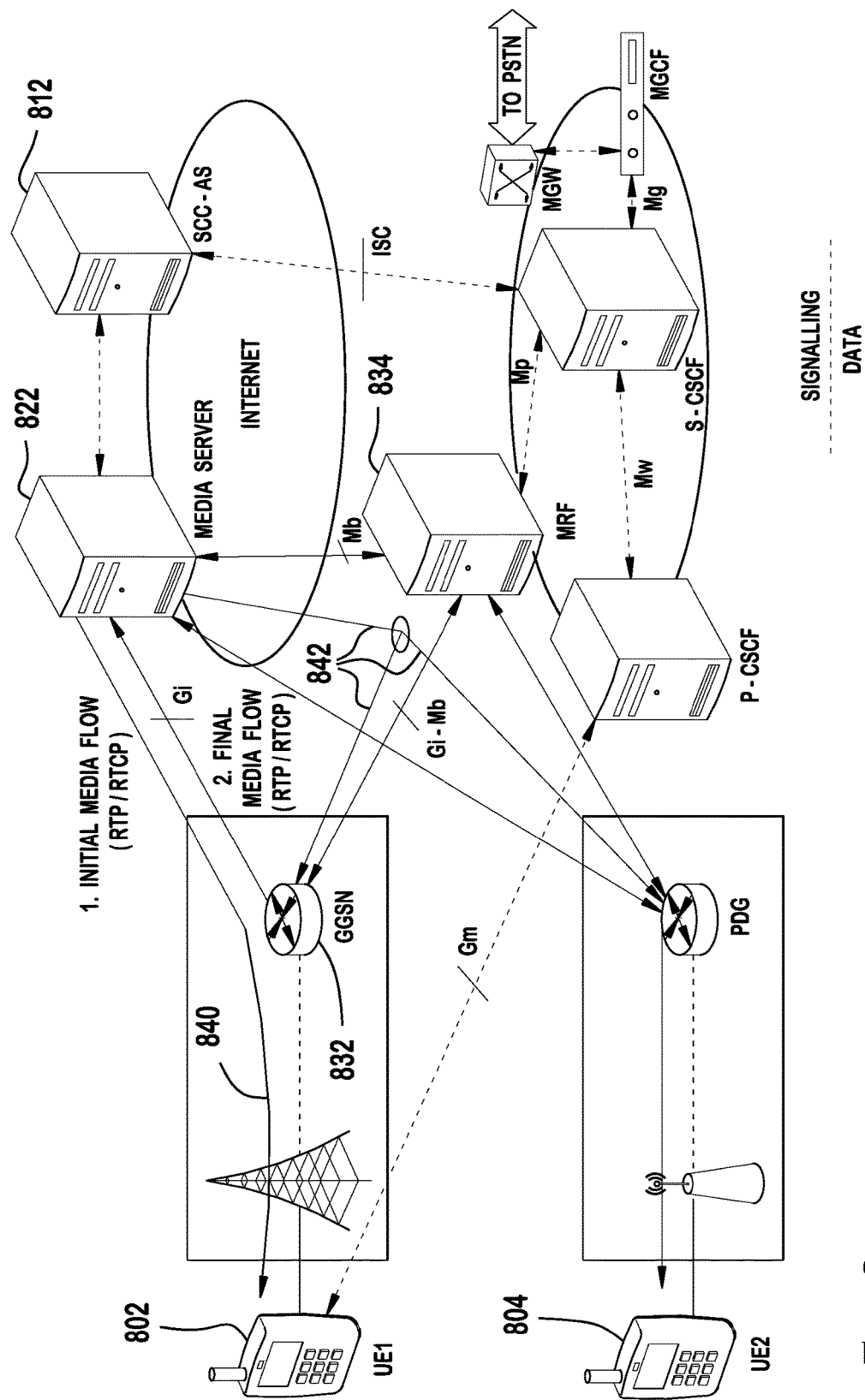
FIG. 8 shows an example IUT operation involving an MRF.

FIG. 8 shows an example IUT operation involving an MRF. UE1 802 currently has a multimedia session and wants to transfer the session to UE2 804. The initial media flow 840 is established from the media server 822 to UE1 802 via a GGSN 832. UE1 802 sends an IUT session transfer request to the SCC AS 812. The IUT session transfer request to the SCC AS 812 triggers the IDMS session for the media streams, and a media stream 842 is established after the transfer.

The media is anchored at the MRF 834 and the IDMS server (i.e., the media synchronization application server), is running on the MRF 834. The IUT session transfer request indicates to the SCC AS 812 that group synchronization is required, and contains the current session ID to be transferred. The IUT session transfer request may specify the synch group ID. Alternatively, the synch group ID may not be included in the IUT session transfer request.

The SCC AS 812 updates the remote leg about the MRF 834 being the terminating point. The SCC AS 812 updates the MRF 834 about the session split or replication and to start a synch server (by forwarding SDP information). The SCC AS 812 obtains the synch group ID, synchronization source (SSRC), RTCP port from the MRF 834 and sends it back to UEs.

The UEs 802, 804 set up RTP/RTCP transport channels with the MRF 834, and start exchanging RTP/RTCP packets and RTCP XR. The MRF 834 transparently intercepts the RTCP packets, and removes the RTCP XR and forwards to the source. The MRF 834 processes the RTCP XR, sends synch settings to the UEs 802, 804 by adding RTCP XR to the RTCP packets coming from the source going to the UEs 802, 804.

Figure 9:
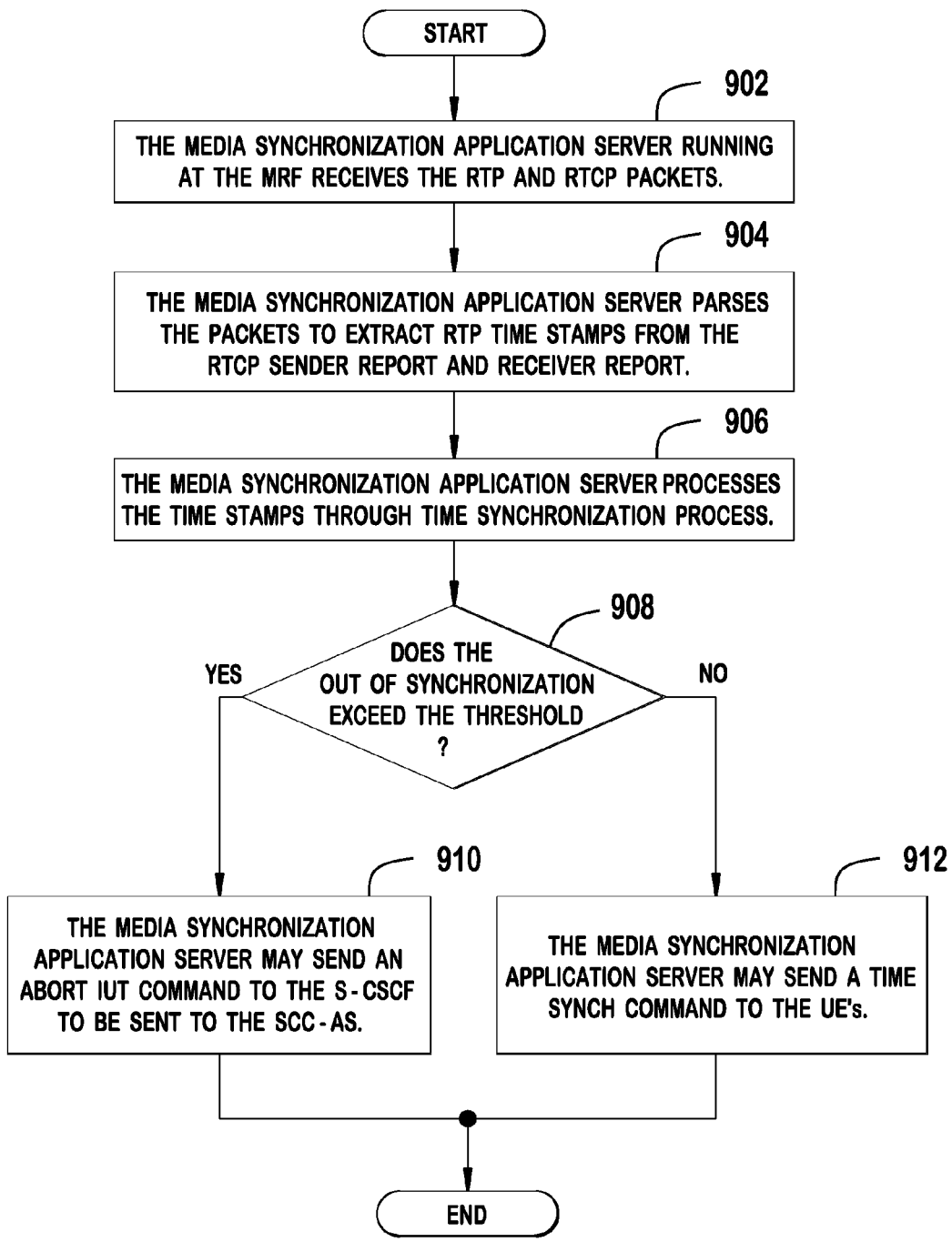
FIG. 9 is a flow diagram of an example process for time synchronization performed by the media resource function (MRF)

FIG. 9 is a flow diagram of an example process for time synchronization performed by the MRF. The media synchronization application server running at the MRF receives the RTP and RTCP packets (902). The media synchronization application server parses the packets to extract RTP time stamps from the RTCP SR and RR (904). The media synchronization application server processes the time stamps through time synchronization process (906). If it is determined that the out of synchronization exceeds the threshold (908), the media synchronization application server may send an abort IUT command to the S-CSCF to be sent to the SCC-AS (910). If it is determined that the out of synchronization does not exceed the threshold (908), the media synchronization application server may send a time synch command to the UEs (912).

Figure 10:
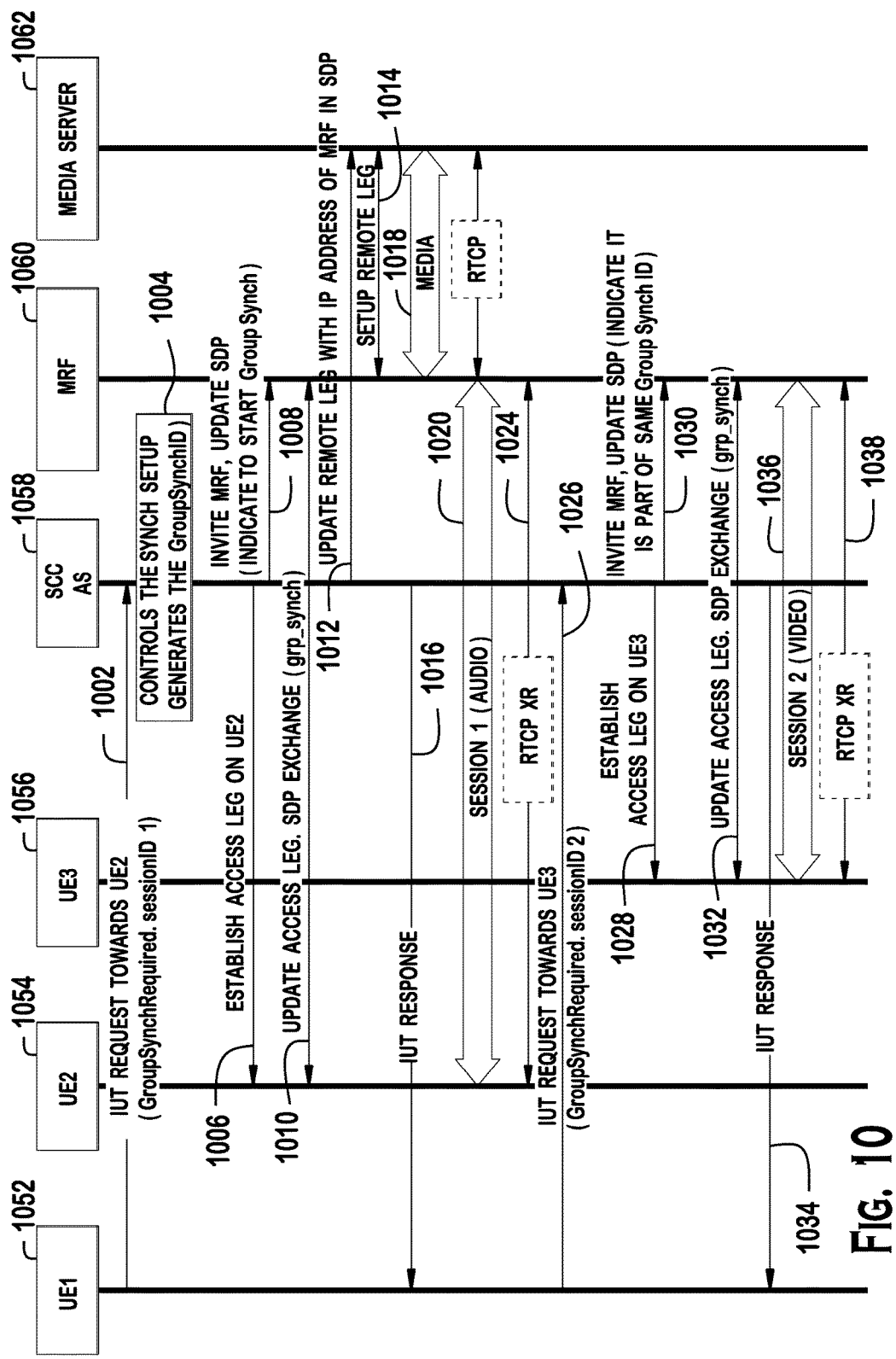
FIG. 10 shows an example signaling flow for the session transfer in accordance with another embodiment where the media is anchored at the MRF.

FIG. 10 shows an example signaling flow for the session transfer in accordance with another embodiment where the media is anchored at the MRF. UE1 currently has multimedia sessions, (e.g., session 1 for audio and session 2 for video), and wants to transfer session 1 to UE2 and session 2 to UE3. The media is anchored at the MRF, and the MRF is capable of running IDMS.

UE1 1052 sends an IUT request to the SCC AS 1058 for transfer of session 1 towards UE2 1054 (1002). The IUT request message includes information for the network to identify the media flow to be transferred, identify the source of the media flow, identify the target of the media flow (i.e., UE2), and the like. For example, the IUT request message may include an indication that group synchronization is required and the session ID to be transferred. The IUT request message may also include a group synch ID. The SCC AS 1058 checks eligibility for the IUT and, if it is not allowed, the SCC AS 1058 informs UE1 1052 that IUT with group synch is not allowed. If it is allowed, the SCC AS 1058 performs the procedures for controlling the synch setup, (e.g., generating a group synch ID), (1004). If the requested session(s) is part of any existing synch group, the SCC AS 1058 retrieves the group synch ID, and updates the database with the session ID(s). If the requested session(s) is not part of the existing synch group, the SCC AS 1058 generates a group synch ID, and associates the session(s) with the group synch ID. In later session transfer requests from the same UE, the SCC AS 1058 may decide, by itself or depend on user input, to determine which synch group should it be associated with.

The SCC AS 1058 sends a request to UE2 1054 to establish an access leg at UE2 1054 for the transferred media session with the MRF 1060 (1006). The SCC AS 1058 allocates media resource for the transferred media in the MRF 1060, indicating to start a group synch (1008).

SDP messages are exchanged between the MRF 1060 and UE2 1054 for group synchronization (1010). The SCC AS 1058 updates the remote leg with the IP address of the MRF 1060 (1012). The remote server 1062 sets up a remote leg with the MRF 1060 (1014). The SCC AS 1058 sends an IUT response to UE1 1052 (1016).

A media flow is established between the remote server 1062 and the MRF 1060, and session 1 is established between the MRF 1060 and UE2 1054 (1018, 1020). RTCP messages are exchanged between the MRF 1060 and the remote server 1062 (1022), and RTCP XRs are exchanged between UE2 1054 and the MRF 1060 (1024).

UE1 1052 sends another IUT request to the SCC AS 1058 for transfer of session 2 towards UE3 1056 (1026). The IUT request message includes information for the network to identify the media flow to be transferred, identify the source of the media flow, identify the target of the media flow (i.e., UE3), and the like. For example, the IUT request message may include an indication that group synchronization is required and the session ID to be transferred. The IUT request message may also include a group synch ID.

The SCC AS 1058 sends a request to UE3 1056 to establish an access leg at UE3 1056 for the transferred media session with the MRF 1060 (1028). The SCC AS 1058 allocates media resource for the transferred media in the MRF 1060, indicating that it is a part of the same group synch ID (1030). SDP messages are exchanged between the MRF 1060 and UE3 1056 for group synchronization (1032). The SCC AS 1058 sends an IUT response to UE1 1052 (1034). A media flow for session 2 is established between the MRF 1060 and UE3 1056 (1036). RTCP XRs are exchanged between UE3 1056 and the MRF 1060 (1038).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method for inter-user equipment (UE) transfer (IUT) of a plurality of current media sessions, the method comprising:

receiving, by a server, an IUT request for transfer of the current media session toward at least one initial UE, the current media session to be played by at least two target UEs, wherein the plurality of current media sessions includes at least a first media session and a second media session;

determining, by the server, eligibility for IUT with group synchronization based on an indication of a request for group synchronization of the current media session among the target UEs;

sending, by the server, a message to the initial UE that IUT with group synchronization is not allowed on a condition that IUT with group synchronization is not allowed; and triggering, by the server, inter-destination media synchronization (IDMS) for group synchronization among the target UEs, updating, by the server, a remote leg with information for group synchronization, and sending, by the server, a request to the at least a first target UE to establish at least a first access leg for the first media session and a second target UE to establish at least a second access leg for the second media session on a condition that IUT with group synchronization is allowed.

2. The method of claim 1 wherein the current media session is anchored at a media server, and a media synchronization application server for the IDMS is running at the media server.

3. The method of claim 1 wherein the first media session is for audio and the second media session is for video.

4. The method of claim 1 further comprising:
retrieving, by the server, a group synch ID; and
updating, by the server, a database with a session ID to be transferred if the current media session is part of an existing synch group.

5. The method of claim 1 further comprising:
generating, by the server, a group synch ID; and
associating, by the server, the current media session with the group synch ID.

6. The method of claim 1 wherein the IUT request includes a group synch ID.

7. The method of claim 1 wherein the current media session is anchored at a media resource function (MRF), and a media synchronization application server for the IDMS is running at the MRF.

8. The method of claim 7 further comprising:
updating, by the server, the MRF with information for group synchronization.

9. The method of claim 1 wherein the server is a service centralization and continuity (SCC) application server (AS).

10. The method of claim 1 wherein the first target UE and the second target UE are geographically separated after the transfer.

11. An apparatus for inter-user equipment (UE) transfer (IUT) of a plurality of current media sessions, the apparatus comprising:
a transceiver operatively coupled to a processor configured to receive an IUT request for transfer of the current media session toward at least one initial UE wherein the current media session to be played by at least two target UEs, wherein the plurality of current media sessions includes at least a first media session and a second media session;
the transceiver and the processor configured to determine eligibility for IUT with group synchronization based on an indication of a request for group synchronization of the current media session among the target UEs;
the transceiver and the processor configured to transmit a message to the initial UE that IUT with group synchronization is not allowed on a condition that IUT with group synchronization is not allowed; and
the transceiver and the processor configured to trigger inter-destination media synchronization (IDMS) for group synchronization of the current media session among the target UEs, update a remote leg with information for group synchronization, and send a request to the at least a first target UE to establish at least a first access leg for the first media session and a second target UE to establish at least a second access leg for the second media session on a condition that IUT with group synchronization is allowed.

12. The apparatus of claim 11 wherein the current media session is anchored at a media server, and a media synchronization application server for the IDMS is running at the media server.

13. The apparatus of claim 11 wherein the first media session is for audio and the second media session is for video.

14. The apparatus of claim 11 wherein the circuitry is configured to retrieve a group synch ID, and update a database with a session ID to be transferred if the current media session is part of an existing synch group.

15. The apparatus of claim 11 wherein the circuitry is configured to generate a group synch ID, and associate the current media session with the group synch ID.

16. The apparatus of claim 11 wherein the IUT request includes a group synch ID.

17. The apparatus of claim 11 wherein the current media session is anchored at a media resource function (MRF), and a media synchronization application server for the IDMS is running at the MRF.

18. The apparatus of claim 11 further comprising:
the transceiver and the processor configured to update the MRF with information for group synchronization.

19. The apparatus of claim 11 wherein the apparatus is a service centralization and continuity (SCC) application server (AS).

20. The apparatus of claim 11 wherein the first target UE and the second target UE are geographically separated after the transfer.

* * * * *